(12) United States Patent
Beasley

(10) Patent No.: US 8,174,928 B2
(45) Date of Patent: May 8, 2012

(54) REDUCING A NUMBER OF REQUIRED CHANNELS FOR SEISMIC SENSORS

(75) Inventor: Craig J. Beasley, Houston, TX (US)

(73) Assignee: WesternGeco L.L.C., Houston, TX (US)

( * ) Notice: Subject to any disclaimer, the term of this patent is extended or adjusted under 35 U.S.C. 154(b) by 828 days.

(21) Appl. No.: 12/193,399

(22) Filed: Aug. 18, 2008

(65) Prior Publication Data

US 2010/0039897 A1    Feb. 18, 2010

(51) Int. Cl.
*G01V 1/00*    (2006.01)
(52) U.S. Cl. ........................................................ 367/79
(58) Field of Classification Search .................... 367/21, 367/22, 38, 56, 76, 78–80
See application file for complete search history.

(56) References Cited

U.S. PATENT DOCUMENTS

| | | | |
|---|---|---|---|
| 4,187,493 A * | 2/1980 | Patterson ...................... | 367/135 |
| 4,628,493 A | 12/1986 | Nelson et al. | |
| 4,953,657 A | 9/1990 | Edington | |
| 5,724,241 A | 3/1998 | Wood et al. | |
| 5,924,049 A | 7/1999 | Beasley et al. | |
| 6,389,362 B1 * | 5/2002 | Garotta et al. .................. | 702/17 |
| 6,430,106 B1 * | 8/2002 | Staron .............................. | 367/77 |
| 6,545,944 B2 | 4/2003 | de Kok | |
| 6,882,938 B2 | 4/2005 | Vaage et al. | |
| 6,906,981 B2 | 6/2005 | Vaage | |
| 7,505,360 B2 * | 3/2009 | Bisley et al. ..................... | 367/24 |
| 7,916,576 B2 | 3/2011 | Beasley | |
| 2003/0080887 A1 | 5/2003 | Havelock | |
| 2005/0128874 A1 * | 6/2005 | Herkenhoff et al. ............ | 367/56 |
| 2008/0123467 A1 * | 5/2008 | Ronnekleiv et al. ............ | 367/20 |
| 2009/0168600 A1 | 7/2009 | Moore | |
| 2009/0323469 A1 | 12/2009 | Beasley | |
| 2009/0326895 A1 | 12/2009 | Beasley | |

FOREIGN PATENT DOCUMENTS

WO    2007095589 A2    8/2007

OTHER PUBLICATIONS

Beasley, et al, A New Look at Simultaneous Sources, 1998 SEG Expanded Abstracts, 1998.
Manin, et al., Industrial and Seismic Noise Removal in Marine Processing, EAEG 55th Meeting and Technical Meeting, 1993.
Lynn, Experimental Investigation of Interference from Other Seismic Crews, Geophysics, Nov. 1987, p. 1501-1524.
Bagaini, Overview of Simultaneous Vibroseis Acquisition Methods, SEG 2006 Annual Meeting, pp. 70-74.
Womack, et al., Encoding Techniques for Multiple Source Point Seismic Data Acquisition, Geophysics, Oct. 1990, pp. 1389-1396, vol. 55, No. 10.

(Continued)

*Primary Examiner* — Jack W Keith
*Assistant Examiner* — Krystine Breier

(57) ABSTRACT

To reduce a number of required channels for a survey system having seismic sensors, the seismic sensors are partitioned into groups of corresponding seismic sensors. An aggregation unit applies different transformations of signals of the seismic sensors within a particular one of the groups. The differently transformed signals within the particular group are aggregated to form an aggregated signal. The aggregated signal for the particular group is transmitted, over a channel of the survey system, to a processing system.

28 Claims, 3 Drawing Sheets

OTHER PUBLICATIONS

Youn, et al., Efficient Data Dissemination and Aggregation in Large Wireless Sensor Networks, IEEE, 2004, p. 4602.
PCT Search Report, dated Mar. 9, 2010, Application No. PCT/US2009/052725.
Moore et al., But Simultaneous Source Separation Using Dithered Sources, SEG 2008 (4 pages).
Berkhout, The Leading Edge, Jul. 2008, Changing the Mindset in Seismic Data Acquisition (11 pages).
Hampson, Acquisition Using Simultaneous Sources, Jun. 2007 (16 pages).
EAGE 69th Conference & Exhibition—London, "untitled article," Jun. 2007 (4 pages).

* cited by examiner

US 8,174,928 B2

REDUCING A NUMBER OF REQUIRED CHANNELS FOR SEISMIC SENSORS

TECHNICAL FIELD

The invention relates generally to reducing a number of required channels for seismic sensors in a subterranean survey system.

BACKGROUND

Subterranean surveying is used to perform characterization of subterranean elements in a subterranean structure. Examples of subterranean elements of interest include hydrocarbon-bearing reservoirs, fresh water aquifers, gas injection zones, and other subterranean elements.

One type of subterranean surveying is seismic surveying, in which seismic sources (e.g., air guns, vibrators, explosives, etc.), and seismic sensors (e.g., hydrophones, geophones, accelerometers, etc.) are deployed. The seismic sources are used to produce seismic waves that are propagated into the subterranean structure, with some of the seismic waves reflected from the subterranean elements of interest. The reflected seismic waves are detected by the seismic sensors.

Some seismic acquisition systems can include a relatively large number of seismic sensors. As a result, the number of independent data streams that have to be recorded can be large. Typically, each data stream from a corresponding to a seismic sensor is communicated over a respective individual data channel. An acquisition system that has a large number of data channels for communicating the data streams can be complicated. For example, an acquisition system that is capable of handling 50,000 channels or more will be more complicated than an acquisition system that only has to handle 5,000 or 10,000 channels.

As complexity of an acquisition system increases, the cost of such acquisition system can also increase, and the reliability can be reduced.

SUMMARY

In general, according to an embodiment, a method of reducing a number of required channels for a survey system having seismic sensors includes partitioning the seismic sensors into groups of corresponding seismic sensors. An aggregation unit is used to apply different time delays (or different encodings) to the signals produced by the seismic sensors within a particular group. The differently delayed or encoded signals within the particular group are then aggregated. The aggregated signal for the particular group is transmitted over a channel of the survey system to a processing system.

Other or alternative features will become apparent from the following description, from the drawings, and from the claims.

DETAILED DESCRIPTION

Figure 1:
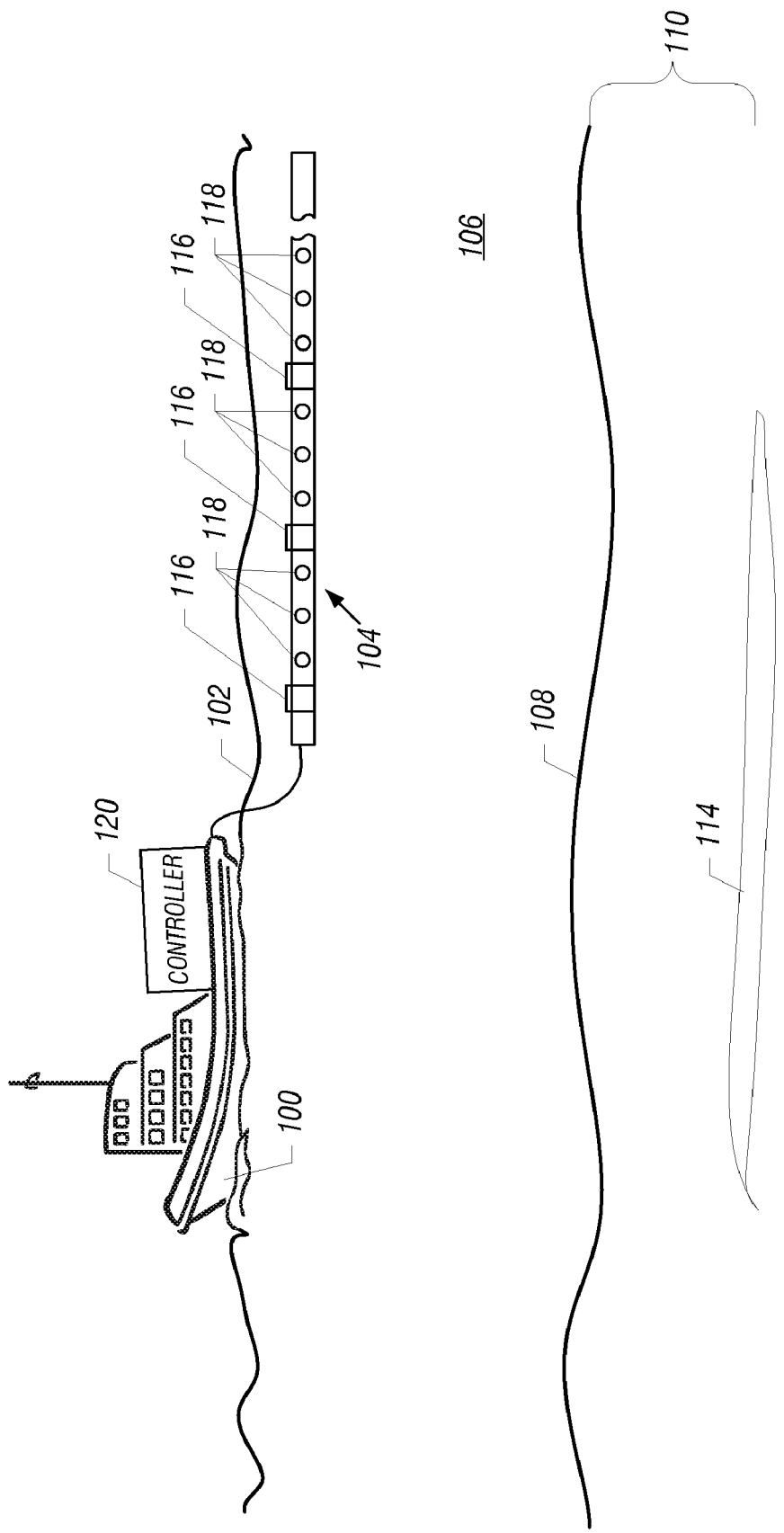
FIG. 1 illustrates an exemplary marine survey arrangement that includes seismic sensors and aggregation units in accordance with an embodiment.

In the following description, numerous details are set forth to provide an understanding of the present invention. However, it will be understood by those skilled in the art that the present invention may be practiced without these details and that numerous variations or modifications from the described embodiments are possible.

In accordance with some embodiments, a mechanism is provided to enable a seismic survey system to employ a reduced number of channels for communicating measurement data from seismic sensors. The number of channels is reduced in the sense that there are a smaller number of channels than there are seismic sensors, such that measurement data from individual seismic sensors do not have to be provided over respective individual channels to a central processing system. Aggregation units can be provided for aggregating signals of respective groups of seismic sensors. The seismic sensors of the survey system are partitioned into groups, where each group can include a corresponding subset of seismic sensors. In other words, the seismic sensors of the survey system are separated into corresponding groups.

An aggregation unit associated with the group can then cause different delays to be applied to the signals generated by the seismic sensors within the group, followed by aggregation of the differently delayed signals to produce a respective aggregated signal. The aggregated signal, which is produced from the aggregation of the differently delayed signals from the seismic sensors within the group, is communicated over a corresponding channel to a central processing system. Communicating the aggregated signal for each group, rather than the signals for individual seismic sensors within each group, allows for the reduced number of channels in communicating measurement data from the seismic sensors to the central processing system.

The aggregation performed by each aggregation unit for a group of seismic sensors allows for the central processing system to later extract individual seismic signals by applying signal separation processing in which each individual seismic signal from a particular seismic sensor in the group is separated from the remaining seismic signals, which are treated as noise. Each individual seismic signal is identified one at a time using the signal separation processing, where the seismic signal of interest is identified by treating the remaining signals of the aggregated signal as noise. Note that the signal separation processing does not have to be a separate processing step; in fact, it could be performed in other subsequent processing, such as migration of the received data.

The aggregation applied by the aggregation unit can be a sum of the individual seismic signals from the seismic sensors in the respective group. Alternatively, other types of aggregations can be performed in other embodiments, such as averaging, determining a median, determining a maximum, determining a minimum, and so forth.

Communicating a signal over a "channel" means communicating the signal over some portion of a shared medium. For example, the shared medium can be made up of wires (electrical conductors) over which electrical signals corresponding to aggregated signals can be communicated. Alternatively, instead of referring to discrete wires, channels can refer to different portions (e.g., time slices or windows, different frequency bands, different encodings, etc.) of the shared medium. Instead of being implemented as an electrical cable with multiple wires, the shared medium can alternatively be implemented with a fiber optic cable, a wireless medium, and so forth.

Conventionally, given a shared medium, if there are N (N>1) number of seismic sensors in the survey system, then N portions of the shared medium would have to be allocated to the corresponding seismic sensors. For example, if a shared medium has a bandwidth of M megabits per second (Mb/s), then the M Mb/s would have to be divided among the N seismic sensors for communicating the individual signals of the N seismic sensors over the shared medium.

In accordance with some embodiments, instead of dividing the shared medium among the N seismic sensors, these N seismic sensors are first divided into L groups, where L<N. The signals produced by the seismic sensors within each of the L groups are delayed differently and then aggregated to produce a corresponding aggregated signal. In this example, L aggregated signals are communicated over the shared medium, rather than N individual signals from the N seismic sensors, which results in having to provide a reduced number of channels for communicating measurement data from the seismic sensors to the central processing system.

FIG. 1 illustrates an exemplary marine survey arrangement that includes a marine vessel 100 for towing a streamer 104 in a body of water 106 between the water surface 102 and a bottom surface 108 (e.g., sea floor). Multiple streamers can be towed by the marine vessel 100. Although a marine survey arrangement is depicted, it is noted that in other implementations, mechanisms according to some embodiments can be incorporated into land-based survey arrangements, borehole survey arrangement, and generally, any seismic acquisition system including wireless telemetry systems and node systems which store their data locally for later collection.

The streamer 104 includes seismic sensors 118. The marine vessel 100 is also capable of towing one or more seismic sources (not shown), where each seismic source is able to emit seismic signals propagated through the body of water 106, and into a subterranean structure 110. The seismic signals are reflected from one or more bodies of interest 114 in the subterranean structure 110, with the reflected signals received by the seismic sensors 118 in the streamer 104.

Examples of seismic sources include air guns, vibrators, explosives, and so forth. Examples of seismic sensors include geophones, hydrophones, accelerometers, and so forth.

In accordance with some embodiments, aggregation units 116 are provided for corresponding groups of seismic sensors. As noted above, each aggregation unit is able to apply different delays to signals produced by seismic sensors of a corresponding group, and then aggregating the differently delayed signals to produce an aggregated signal that can then be communicated over a channel to a central processing system. In the example of FIG. 1, the central processing system is a controller 120, which can be implemented with a computer or some other type of processing system.

Figure 2:
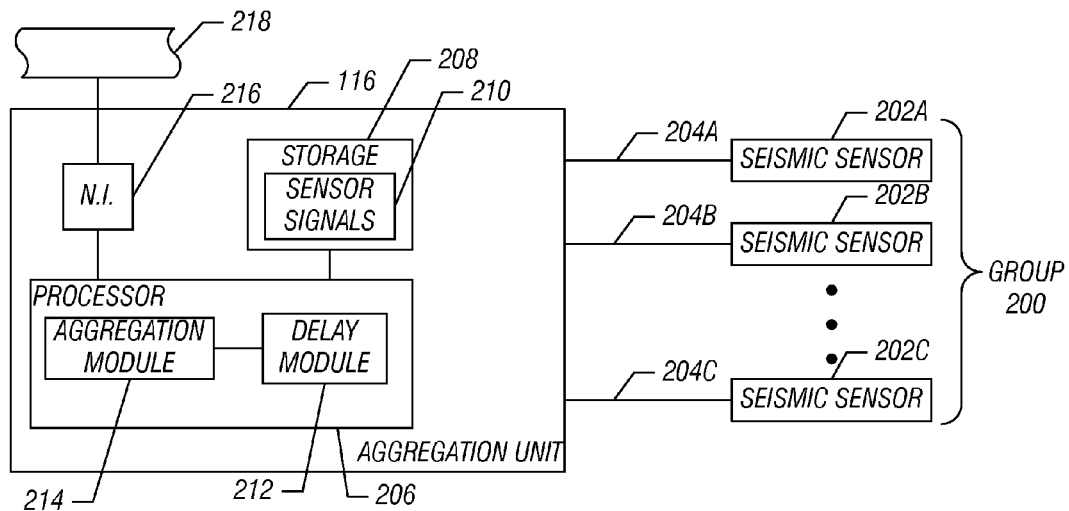
FIG. 2 illustrates seismic sensors partitioned into groups, where each group includes a number of seismic sensors that produce signals that are then delayed by different amounts and then aggregated, by an aggregation unit, for communication over a reduced number of channels to a processing system, in accordance with an embodiment.

FIG. 2 illustrates a group 200 of seismic sensors 202A, 202B, and 202C and an associated aggregation unit 116. Although three seismic sensors are depicted in FIG. 2, it is noted that the group 200 can include just two seismic sensors, or more than three seismic sensors.

The seismic sensors 202A-202C are connected over links 204A, 204B, and 204C to the aggregation unit 116, which includes a processor 206 that is connected to storage 208. The storage 208 can be implemented with an integrated circuit storage device (e.g., dynamic random access member) or a disk-based storage device (e.g., magnetic or optical disk-based storage device). Sensor signals received from the individual seismic sensors 202A-202C over the links 204A-204C are stored (210) in the storage 208. The sensor signals 210 are retrieved by the processor 206, which includes a delay module 212 for applying delays to respective individual sensor signals, and an aggregation module 214 for aggregating the differently delayed individual sensor signals received from the delay module 212. Alternatively, signals can be delayed or encoded and aggregated on the fly by well-known real-time means where the signals are buffered only as long as necessary and then aggregated immediately during transmission.

The delay module 212 and aggregation module 214 can be implemented as software executable on the processor 206. Alternatively, the delay module 212 and aggregation module 214 can be implemented as hardware (e.g., application specific integrated circuit devices, field programmable gate arrays, etc.).

The aggregation module 214 produces an aggregated signal that represents the aggregation of the differently delayed individual sensor signals, and communicates the aggregated signal through a network interface 216 to a network (shared medium) 218 that is part of the streamer 104 (FIG. 1). The network 218 can communicate data packets, such as according to an Internet Protocol (IP).

The different delays applied by the delay module 212 can be based on random selection of the delays. For example, the individual sensor signal from seismic sensor 202A can be delayed by 5 milliseconds, the individual sensor signal from the seismic sensor 202B can be delayed by 16 milliseconds, and the individual sensor signal from the seismic 202C can be delayed by 10 milliseconds, with the different time delays selected randomly. The application of random delays to different individual signals allows for signal separation processing by the controller 120 (FIG. 1) later in which each individual signal is separated from the aggregated signal, with the remaining signals treated as random noise. Alternatively, optimal time delays can be applied, such as described in U.S. patent application Ser. No. 12/174,310 entitled "Optimizing a Seismic Survey for Source Separation," by Craig J. Beasley et al.

Instead of applying random delays to different individual sensor signals, a different embodiment applies vibroseis encoding to the individual sensor signals. Such encoding can include phase and amplitude encoding, frequency sweeps and the like. Examples of such encoding are described in Claudio Bagaini, *Overview of Simultaneous Vibroseis Acquisition Methods*, SEG Expanded Abstracts 25, 70-74 (2006); and J. E. Womack et al., *Encoding Techniques for Multiple Source Point Seismic Data Acquisition*, Geophysics, 55, 1389-1396 (1990). The different individual sensor signals from the seismic sensors of the group are encoded differently (such as by an encoding module that replaces the delay module 212 of FIG. 2), and the differently encoded signals are then aggregated by the aggregation module 224 into an aggregated signal.

More generally, the individual sensor signals within each group are differently transformed (e.g., differently delayed or differently encoded) prior to aggregation to form a corresponding aggregated signal.

The effect of aggregating the differently transformed individual sensor signals into an aggregated signal is that the individual survey signals are effectively destroyed by being aggregated into a merged or aggregated signal.

One aggregated signal is produced for each shot (a particular activation of at least one seismic source). Note that one shot can correspond to activation of one seismic source, or alternatively, simultaneous (or almost simultaneous) activation of multiple seismic sources. Subsequent aggregated signals can be produced for subsequent shots, such that multiple aggregated signals are produced in response to corresponding shots for each group 200 of seismic sensors. Each such aggregated signal can be considered a trace that is responsive to a corresponding shot. For P shots (P≧2), there will be P traces.

Since the individual content of the seismic sensors within a group has been destroyed due to merging with other content of other seismic sensors in the group, the controller 120 that receives the aggregated signals performs signal separation processing to extract the individual sensor signals from the aggregated signals. For each group, the controller 120 extracts the individual sensor signals one at a time. Thus, focusing on the first seismic sensor 202A of group 200, the controller 120 will apply a time shift (or decoding) to each of the traces (traces 1 to P. P≧2), where the applied time shift (or decoding) is the opposite of the delay (or encoding) applied by the delay module 212 to the individual sensor signal prior to aggregation. The time shifts and encodings applied to signals by the aggregation units are stored at the controller 120.

Since the sensor signals associated with the other seismic sensors in the group have been randomly perturbed (due to application of random delays or the vibroseis encoding), the signals associated with such other seismic sensors will appear to be random noise. Such random noise can be removed to isolate the desired individual sensor signal for seismic sensor 202A, such that the individual sensor signal for seismic sensor 202A in each of traces 1 to P can be recreated from the aggregated signals corresponding to the traces. In other words, the extracted individual sensor signal appears coherent, while the remaining sensor signals of the aggregated signal appear incoherent. Thus, the processing applied on the aggregated signals is one in which a specified one of the seismic sensors is coherent and other aggregated seismic sensors are incoherent. Examples of processing can include common offset filtering or common midpoint filtering.

The above process is repeated for each of the other seismic sensors such that the individual sensor signals for such other seismic sensors can also be recreated.

Figure 3:
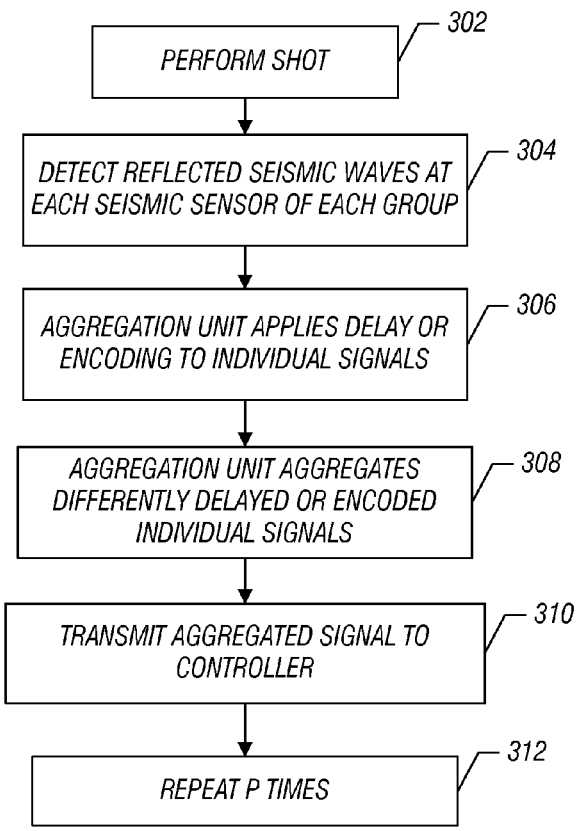
FIG. 3 is a flow diagram of a process of acquiring seismic signals in accordance with an embodiment.

FIG. 3 illustrates a flow diagram of an exemplary process according to an embodiment. A shot is performed (at 302), which is accomplished by activating at least one seismic source. Next, reflected seismic signals (at 304) are detected at each seismic sensor of each group. Individual sensor signals from the seismic sensors of each group are provided to the aggregation unit, which applies (at 306) different delays (random delays) or different encoding (e.g., vibroseis encoding) to the individual sensor signals. The differently delayed or encoded individual sensor signals are then aggregated (at 308) by the aggregation module 214 to produce an aggregated signal. The aggregated signal is then transmitted (at 310) to the controller 120. The process of FIG. 3 is then repeated P times in response to P shots.

Figure 4:
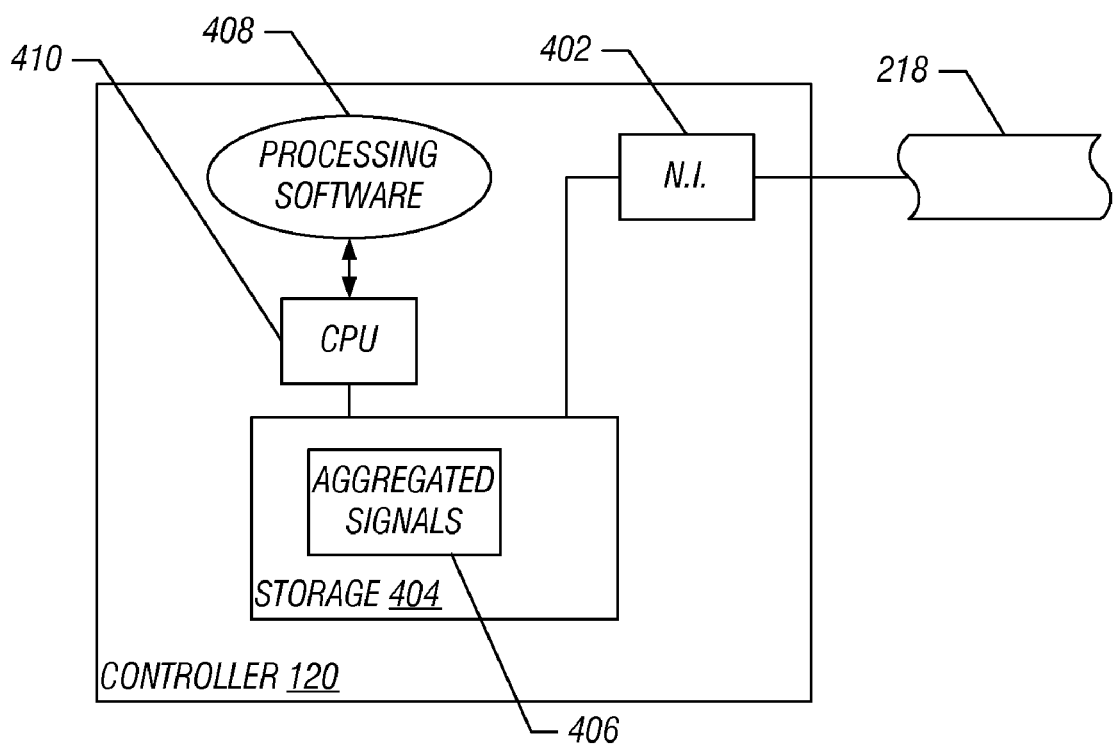
FIG. 4 is a block diagram of an exemplary computer in which processing software according to an embodiment can be incorporated.

As depicted in FIG. 4, the aggregated signals communicated by the various aggregation units 116 in the streamer 104 are received over the network 218 by a network interface 402 in the controller 120. The received signals are stored in storage 404. The stored aggregated signals are represented as 406.

The controller 120 includes processing software 408 that is executable on one or more central processing units (CPUs) 410. The processing software 408 applies the signal separation processing discussed above to the aggregated signals 406 to extract individual sensor signals one at a time from the aggregated signals.

One technique of recovering an individual sensor signal from an aggregated signal can be as follows. The seismic data (including multiple traces responsive to multiple shots) are migrated based on some model of the subterranean structure. Migration of the data suppresses the noise, which in this case is noise due to the other seismic sensors. The data could then be used as conventional seismic data or, after migration, the techniques described in U.S. patent application Ser. No. 12/165,185 entitled "Technique and System for Seismic Source Separation," by Craig J. Beasley, where, generally, an inverse migration process is performed on the migrated seismic data to produce un-migrated prestack data. The un-migrated prestack data represents the individual sensor signal for the seismic sensor of interest, with content contributed by the other seismic sensors removed. Migration is only one type of seismic processing that can be used directly to separate the aggregated signals, so it is not generally necessary to first separate the data before beginning processing.

In an alternative implementation, a different separation technique can be based on well-known filtering techniques such as f-k, random noise removal (f-decon and the like), f-k and radon filter. More powerful filtering methods such as the technique described in U.S. patent application Ser. No. 11/964,402, entitled "Separating Seismic Signals Produced by Interfering Seismic Sources," filed Dec. 26, 2007, by Ian Moore et al., can also be used. This separation technique involves the defining unknown models for the different sensor signals of a group 200, and then defining a linear system that includes known operators, the aggregated signals, and the unknown models. The linear system is solved for the unknown models of the individual sensor signals using a least squares QR (LSQR) algorithm. Once the unknown models are known, then the individual sensor signals can be re-constructed by the controller 120.

Instructions of software described above (including processing software 408 of FIG. 1) are loaded for execution on a processor (such as one or more CPUs 410 in FIG. 4). The processor includes microprocessors, microcontrollers, processor modules or subsystems (including one or more microprocessors or microcontrollers), or other control or computing devices. A "processor" can refer to a single component or to plural components.

Data and instructions (of the software) are stored in respective storage devices, which are implemented as one or more computer-readable or computer-usable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

While the invention has been disclosed with respect to a limited number of embodiments, those skilled in the art, having the benefit of this disclosure, will appreciate numerous modifications and variations therefrom. It is intended that the appended claims cover such modifications and variations as fall within the true spirit and scope of the invention.

What is claimed is:

1. A method of reducing a number of required channels for a survey system having a plurality of seismic sensors, comprising:

partitioning the plurality of seismic sensors into groups of corresponding seismic sensors, wherein the plurality of seismic sensors are provided at respective positions along a cable of the survey system;

applying, using an aggregation unit, different transformations of signals of the seismic sensors within a particular one of the groups;

aggregating, by the aggregation unit, the differently transformed signals of the seismic sensors within the particular group to form an aggregated signal; and transmitting, over a channel of the cable, the aggregated signal for the particular group to a processing system, wherein the transformations of the signals of the seismic sensors within the particular group allow recovery of the signals from the aggregated signal at the processing system.

2. The method of claim 1, wherein applying the different transformations of the signals comprises applying different delays to the signals.

3. The method of claim 2, wherein applying the different delays to the signals comprises applying different random delays.

4. The method of claim 1, wherein applying the different transformations of the signals comprises applying different encodings to the signals.

5. The method of claim 1, further comprising:
applying, using other aggregation units, different transformations of the signals of the seismic sensors within other ones of the groups;
aggregating the differently transformed signals within the other groups to form other aggregated signals; and
transmitting, over other respective channels of the cable, the other aggregated signals for the respective other groups to the processing system.

6. The method of claim 5, wherein transmitting the aggregated signals instead of individual signals from the seismic sensors enables reduction of the number of the channels in the cable for communicating signals from the seismic sensors to the processing system.

7. The method of claim 1, further comprising:
the processing system applying a particular de-transformation to the aggregated signal to enable extraction of a corresponding individual signal for a respective seismic sensor in the particular group, wherein the particular de-transformation is an opposite of the transformation applied by the aggregation unit for the respective seismic sensor.

8. The method of claim 7, wherein the particular de-transformation comprises one of a time shift and a decoding.

9. The method of claim 7, wherein the de-transformation is applied by one of (1) a recording system that recorded the aggregated signal and (2) subsequent processing after recording of the aggregated signal.

10. The method of claim 1, further comprising applying processing on the aggregated signal that suppresses an incoherent portion of the aggregated signal.

11. The method of claim 10, wherein applying the processing comprises applying migration.

12. The method of claim 10, wherein applying the processing comprises applying processing in which a signal of a specified one of the seismic sensors within the particular group is coherent and signals of other seismic sensors within the particular group are incoherent.

13. The method of claim 12, wherein applying the processing comprises applying common offset processing or common midpoint processing.

14. A system for performing seismic surveying, comprising:
a cable;
a plurality of groups of seismic sensors provided at respective positions along the cable;
an aggregation unit comprising:
a first module to transform individual sensor signals from respective seismic sensors of a particular one of the groups, wherein the individual sensor signals are transformed differently;
a second module to aggregate the differently transformed individual sensor signals to form an aggregated signal; and
a network interface to transmit, to a processing system, the aggregated signal over the cable, wherein the transformations of the individual sensor signals allow recovery of the individual sensor signals from the aggregated signal at the processing system.

15. The system of claim 14, further comprising other aggregation units to apply different transforms of individual sensor signals of respective seismic sensors in other groups, and to aggregate the differently transformed individual sensor signals of each of the other groups into a respective aggregated signal,
wherein the aggregation units are configured to communicate the aggregated signals for the other groups over the cable to the processing system.

16. The system of claim 14, further comprising:
the processing system to apply signal separation processing to the aggregated signal to extract the individual sensor signals from the aggregated signal.

17. The system of claim 16, wherein the signal separation processing includes separating a particular one of the individual sensor signals while the other individual sensor signals are treated as noise.

18. The system of claim 14, wherein the differently transformed individual sensor signals comprise differently delayed individual sensor signals.

19. The system of claim 14, wherein the differently transformed individual sensor signals comprise differently encoded individual sensor signals.

20. The system of claim 14, wherein aggregating the differently transformed individual sensor signals includes summing the differently transformed individual sensor signals.

21. An article comprising at least one computer-readable storage medium containing instructions that when executed cause a computer to:
receive a plurality of aggregated signals corresponding to a plurality of groups of seismic sensors, wherein a particular one of the aggregated signals represents an aggregation of differently transformed individual sensor signals of seismic sensors in a particular one of the groups of seismic sensors, wherein the plurality of aggregated signals are received over a cable, and wherein the seismic sensors are provided at respective positions along the cable;
apply signal separation processing to the particular aggregated signal to separate a particular one of the individual sensor signals, wherein the signal separation processing includes treating individual sensor signals other than the particular individual sensor signal as noise such that the noise is removed from the aggregated signal to extract the particular individual sensor signal.

22. The article of claim 21, wherein the differently transformed individual sensor signals comprise differently delayed individual sensor signals.

23. The article of claim 21, wherein the differently transformed individual sensor signals comprise differently encoded individual sensor signals.

24. The article of claim 21, wherein the signal separation processing applies a de-transformation that is an opposite of the transforming applied to the particular individual sensor signal.

25. The method of claim 1, wherein the cable is part of a streamer.

26. The method of claim 1, wherein the transmitting is performed after the aggregating.

27. The system of claim 14, wherein the cable is part of a streamer.

28. The system of claim 14, wherein the aggregating to be performed by the second module is to occur after the transforming to be performed by the first module.

* * * * *